Feb. 12, 1957 G. E. McELROY 2,781,458

ELECTRONIC PULSE SHAPING AND DELAY CIRCUIT

Filed March 26, 1954

INVENTOR.
GEORGE E. Mc ELROY
BY Darby & Darby
ATTORNEYS 2,781,458
Patented Feb. 12, 1957

2,781,458

ELECTRONIC PULSE SHAPING AND DELAY CIRCUIT

George E. McElroy, Harrington Park, N. J., assignor to Allen B. Du Mont Laboratories, Inc., Clifton, N. J., a corporation of Delaware Application March 26, 1954, Serial No. 418,913

5 Claims. (Cl. 307—106)

Figure 1:
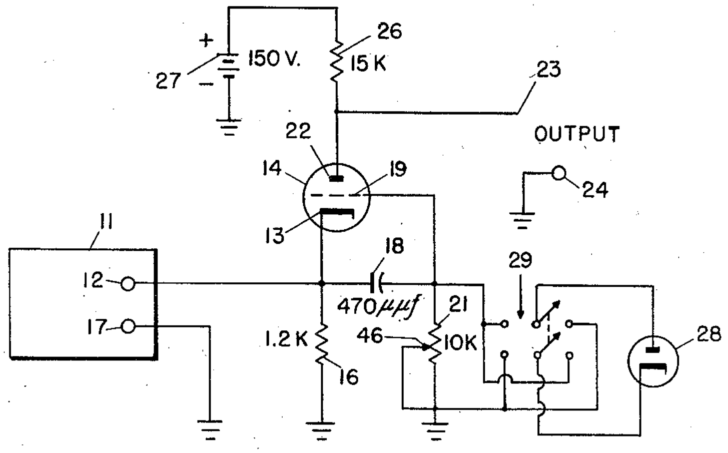

This invention relates to electrical or electronic circuits, and particularly to a circuit for shaping pulses of electrical energy so as to cause, in effect, a phase delay thereof.

It is among the objects of the invention to provide an electrical pulse delay circuit which is economical and reliable, and which permits continuous control of the delay time thereof. Other objects will be apparent.

The invention operates, in essence, by creating sloping leading and trailing edges on square-wave pulses effectively to delay the pulses.

Figure 2:
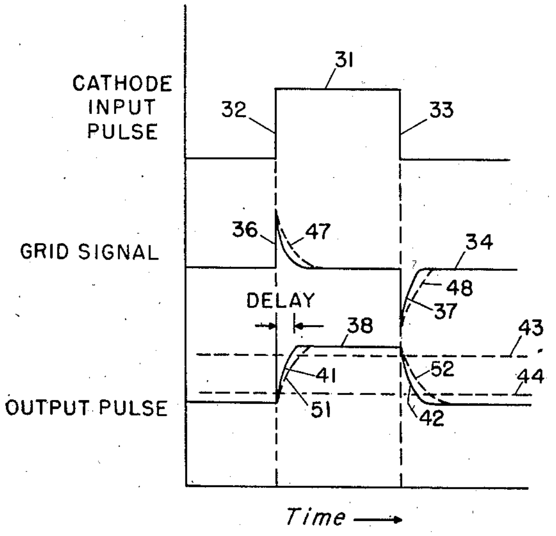

In the drawing,

Fig. 1 is an electrical schematic diagram of a preferred embodiment of the invention, and Fig. 2 shows graphically, voltage wave forms which appear in the circuit of Fig. 1.

Referring to Fig. 1, the preferred circuit comprises a source 11 of pulses of square waves connected, by means of an output terminal 12, to a cathode 13 of an electronic tube 14. A cathode bias resistor 16 is connected between the cathode 13 and electrical ground. A remaining output terminal 17 of the pulse source 11 is connected to electrical ground. The bias resistor 16, in addition to providing bias for the tube 14, also acts as a load resistance across the output terminals of the pulse source 11.

A capacitance 18 is connected between the cathode 13 and a control grid 19 of the tube 14. A variable resistance 21 is connected between the control grid 19 and electrical ground. An anode or output electrode 22 of the tube 14 is connected to a signal output terminal 23. A remaining signal output terminal 24 is connected to electrical ground. An output load resistance 26 and a source 27 of voltage are connected in series between the anode 22 and electrical ground. A diode tube 28 is selectively connected across the resistance 21 by means of a polarity-reversing switch 29.

The invention operates as follows. The pulse source 11 provides substantially rectangular or square shaped pulses 31 as shown in Fig. 2, these pulses being fed to the cathode 13 of the amplifier tube 14. When the resistor 21 is shorted or adjusted to have zero value, the tube 14 functions as a conventional grounded-grid amplifier, and an amplified reproduction of the input pulse 31 appears at the output terminals 23, 24. If the delay-control resistance 21 is adjusted to have a finite value of resistance with the switch 29 opened as shown, then the condenser 18 and resistance 21 function as a differentiator circuit and apply the higher frequencies, which constitute the leading and trailing edges 32, 33 of the input pulse 31, to the control grid 19 of the tube 14. The differentiated portions of the input signal are indicated in the grid signal 34 shown in Fig. 2, in which the portion 36 is the differentiated leading edge 32, and the portion 37 is the differentiated trailing edge 33, of the input pulse 31.

The differentiated signals 36, 37 are subtracted, due to the grid-cathode action of the tube 14, from the leading and trailing edges 32, 33 of the input pulse 31, resulting in an output signal 38 having sloped leading and trailing edges 41, 42. The sloped leading edge 41 provides, in effect, a delayed pulse in the regions near the peak of the pulse, as indicated by the dotted line 43. The sloped trailing edge 42 of the output pulse 38 constitutes, in effect, a delayed trailing edge of the input pulse 31 in the low-amplitude regions of the pulse, as indicated by the dotted line 44.

In the above described operation of the invention, the diode switch 29 is open. If the switch 29 is closed so as to connect the anode of the diode 28 to the control grid 19 and the cathode thereof to electrical ground, the diode 28 will remove the leading edge differentiated signal 36, whereby only the trailing edge 33 of the pulse 31 will be delayed. Conversely, if the switch 29 is closed so as to connect the cathode of the diode 28 to the grid 19 and the anode thereof to electrical ground, then the diode 28 will remove the trailing edge differentiated signal 37, whereby only the leading edge 32 of the pulse 31 will be delayed.

Various types of utilization circuits may make use of the delayed pulse produced by the invention. For example, by clipping the delayed output pulse 38 at the level 43, the delayed leading edge may be utilized. By clipping the delayed output pulse 38 at the level 44, the delayed trailing edge may be employed. The utilization circuit, instead of performing clipping actions at the level 43 and 44, may have a threshhold control level as indicated by the dotted lines 43 or 44. Differing amounts of the delay in the pulse may be utilized by employing a utilization circuit having a clipping level or threshhold level intermediate the levels indicated by the dotted lines 43 and 44.

The differentiating capacitance 18 preferably has a relatively small value, and the cathode-bias resistance 16 likewise preferably has a small value, so as to minimize capacitive loading on the pulse source 11. Using the cathode of the amplifier tube 14 as the pulse input electrode facilitates the use of a low value of input resistance 16, since the cathode of an electron tube inherently has a lower input resistance than does the control grid. The control grid, on the other hand, having a relatively high input impedance serves admirably as the differentiated signal electrode, because the high impedance of the grid 19 permits the use of a smaller value of differentiating capacitance 18 along with a relatively higher value of delay-control resistance 21. It is to be understood, however, that it is possible to utilize the control grid 19 as the input electrode and to utilize the cathode 13 as the differentiated signal electrode. If transistors or other devices are used in place of an electron tube, the above considerations may aid in determining which of the control electrodes to employ as the signal input electrode.

If the value of control resistance 21 is increased, which may be readily accomplished by movement of the adjustable contact 46, the time constant of the differentiating circuit will be increased, thereby resulting in a longer-duration differentiated signal as indicated by the dotted lines 47, 48. This will result in a greater slope and, hence, greater delay in the output signal, as indicated by the dotted lines 51, 52. If desired, differing values of capacitance 18 may be switched into the circuit.

In a practical embodiment of the invention, pulses may be effectively delayed over a controlled range of from zero to approximately three microseconds, using the component values shown in Fig. 1 of the drawing.

While a preferred embodiment of the invention has been shown and described, various modifications thereof will be apparent to those skilled in the art. The scope of invention is defined in the following claims.

What is claimed is:

1. An electronic pulse delay circuit comprising an electron tube having a cathode and a control grid, a source of substantially rectangular-shaped pulses connected to said cathode, a differentiator circuit connected between said cathode and said grid, and means connected in said differentiator circuit to clip differentiated signals from said differentiator circuit.

2. The circuit in accordance with claim 1, in which said means comprises a diode connected in said differentiator circuit to clip differentiated signals having a predetermined polarity.

3. An electronic pulse delay circuit comprising an electronic tube having a cathode, a control grid, and an anode, a first resistor connected between said cathode and electrical ground, a source of substantially rectangular shaped signals connected across said resistor, a condenser connected between said cathode and control grid, a second resistor connected between said control grid and electrical ground, an output load circuit connected to said anode, and means connected to said second resistor to clip differentiated signals appearing across said resistor.

4. The circuit in accordance with claim 3, in which said second resistor is variable to provide control of the shape of said signals.

5. The circuit in accordance with claim 3, in which said means comprises a diode connected across said second resistor.

References Cited in the file of this patent

UNITED STATES PATENTS

| | | |
|---|---|---|
| 2,400,908 | Birss | May 28, 1946 |
| 2,537,589 | Johnson | Jan. 9, 1951 |